United States Patent [19]

Daussan et al.

[11] Patent Number: 4,544,409
[45] Date of Patent: Oct. 1, 1985

[54] COATING FOR PROTECTING CONSTRUCTIONS, PARTICULARLY AGAINST HEAT AND FIRE

[75] Inventors: Jean-Charles Daussan; Gérard Daussan, both of Metz; André Daussan, Longeville les Metz, all of France

[73] Assignee: Daussan et Compagnie, Woippy, France

[21] Appl. No.: 658,062

[22] Filed: Oct. 5, 1984

Related U.S. Application Data

[63] Continuation of Ser. No. 448,192, Dec. 9, 1982, abandoned, which is a continuation-in-part of Ser. No. 230,963, Jun. 4, 1980, abandoned.

[30] Foreign Application Priority Data

Jun. 5, 1979 [FR] France .................................. 7914285

[51] Int. Cl.$^4$ ................................................ C09D 5/16
[52] U.S. Cl. ..................................... 106/18.14; 106/89; 106/99; 106/104; 252/62
[58] Field of Search ................ 106/18.14, 89, 99, 104; 252/62

[56] References Cited

U.S. PATENT DOCUMENTS 2,516,342 7/1950 Randall et al. ........................ 106/90
4,166,749 9/1979 Sterrett ................................. 106/93

Primary Examiner—Lorenzo B. Hayes
Attorney, Agent, or Firm—Young & Thompson

[57] ABSTRACT

A coating for protecting constructions against fire and heat, comprises 10 to 80% by weight of aluminous and/or Portland cement and 5 to 20% by weight of hydrated trisodium phosphate ($Na_3PO_4.12H_2O$). A small but effective amount of a flux can be included, which can be calcium borate and/or fluorspar, the amount being effective to assure superficial sintering of the refractory particles at a temperature between 850° and 900° C. This temperature range is selected because if sintering takes place below 850° C., the cracks which form in the coating are filled too soon by fusion of the inorganic particles under the action of the flux; while if sintering takes place above 900° C., the coating becomes detached from the supporting surface because the binder loses all of its adhesive power. The coating can also include inorganic particles, e.g. alumina, sand, perlite and/or vermiculite, and also organic particles.

4 Claims, No Drawings

COATING FOR PROTECTING CONSTRUCTIONS, PARTICULARLY AGAINST HEAT AND FIRE

This application is a continuation of application Ser. No. 448,192, filed 12/9/82, now abandoned, which is a C.I.P. of parent application Ser. No. 230,963 filed June 4, 1980 and now abandoned.

The present invention relates to a coating for protecting structures, more particularly against fire and heat.

The word "coating" is used hereinafter in its strict sense, thus excluding all solid materials, such as brick and perpend-stone having sufficient strength to be used for the fabrication of major construction works.

The word "structures" is used hereinafter mainly to indicate walls, ceilings, roofing, doors and frames of dwellings or industrial or agricultural buildings, garages and hangers made with metal beams, joists and pillars, trusses which are solid, perforated, or in the form of lattices, partition, panels made of plastic or expanded materials, false ceilings and the suspension-sections thereof, fire-resistant shields, ventilation shafts, smoke and fire conduits, pipelines, more particularly pipelines for petroleum products and the like inflammable materials.

In the following specification, the word "structures" will also be used to cover floating structures such as ships, storage tanks for inflammable products such as petroleum and chemical products, casings of hydraulic or atomic turbines, atomic reactors and the like.

For the purpose of protecting the foregoing structures from the effects of fire and heat, general use has already been made of asbestos products, ceramic fibre products, and rock-wool or glass fibre products, possibly coated with an inorganic or organic binder.

Among the binders most commonly used for coating the aforesaid fibres etc., special mention may be made of the following: ordinary cements of the "Portland" type, magnesia cements, plaster, aluminum monophosphate and chlorophosphate, and phosphatic binders.

The density of these fibre-resistant products is between 0.3 and 1.2. Light products, having a density of between 0.3 and 0.4 usually have a base of mineral fibres such as rock-wool, basalt wool, or blast furnace-slag wool, mixed with ordinary "Portland" type cement in a ratio of between 40 and 50% of cement to between 50 and 70% of fibre. The resistance of these products to heat is mediocre and they provide relatively little thermal insulation. They rarely resist fire for more than sixty or ninety minutes, unless they are compacted or compressed to a density of up to about 0.9, with a protection thickness greater than or equal to 30 mm.

Fire-resistant products of greater density, i.e. between about 0.9 and 1.2, are generally in the form of a projectable mud having a base of plaster, ordinary cement or magnesia cement, containing refractory particles and fibres.

These latter products resist fire better and also have a better thermal-insulation coefficient than the lower-density products mentioned above.

However, none of the above referred to known fire-resistant products withstands a temperature of more than 800°–900° C. In fact, they lose their cohesion at these temperatures, since the inorganic binder disintegrates into a powder. As a result of this, the fire-resistant product becomes detached from the surface to which it was applied, leaving the surface unprotected against the effects of fire and heat.

Known products also have the disadvantage of heating up quickly when exposed to heat, thus rapidly reaching the heat-threshold at which they are no longer able to perform their protective function.

It is the main purpose of the invention to overcome the foregoing disadvantages.

The coating for protecting structures, more particularly against fire and heat, comprises aluminous or Portland cement.

According to the present invention, the said coating is characterized in that it also contains hydrated trisodium phosphate imparting to cement during the setting thereof, a number of molecules of water of crystallization higher than that normally obtained with the cement alone.

Inorganic binders, especially cements, form as they set, molecules of water of crystallization. Thanks to the presence in the coating of the above-mentioned inorganic compound, the number of the said molecules of water of crystallization is increated in the hardened coating. The above trisodic phosphate crystallizes normally with the maximum of 12 $H_2O$ molecules.

Experience has shown the surprising result, that the above-mentioned trisodium phosphate increases considerably the protection against fire obtained with the coating.

It has actually been found that a coating of this kind, when exposed to heat or fire, heats up much less rapidly than known coatings; the larger the number of molecules of water of crystallization contained in the coating, the lower the average velocity of temperature increase.

Without restricting the present invention to this explanation, it is believed that this characterictic is due to the fact that the release of the water of crystallization requires the application of a considerable amount of heat, the effect of which is to keep the temperature of the coating to a low value of between 100° and 200° C. as long as the water of crystallization has not been released.

Moreover, the cracking and disintegration of the coating mentioned above are due precisely to this release of the water of crystallization formed during the setting of the inorganic binder in the presence of water.

Experts in this field have thus hitherto been discouraged from increasing the amount of water of crystallization in the coating, as proposed by the present invention, out of fear of accelerating or increasing cracking and disintegration of the coating.

According to the preferred version of the present invention, the coating also contains a sufficient proportion of flux particles to assure superficial sintering of the refractory particles at a temperature substantially between 850° and 900° C.

This sintering causes the refractory particles to weld together, thus surprisingly maintaining the cohesion of the coating after the inorganic binder has cracked and disintegrated under the effect of fire and heat. This sintering of the particles, brought about by the addition of the flux, thus takes over the function performed by the inorganic binder until the disintegrating temperature is reached.

The above-mentioned temperature range is critical for the following reasons:

if the sintering takes place above 900° C., the coating becomes detached from the supporting surface because the binder loses all of its adhesive power;

if the sintering takes place below 850° C., the cracks which form in the coating below that temperature are filled up much too soon by fusion of the inorganic particles under the action of the flux; this prevents evacuation of the final fractions of water of crystallization, allowing gas-pockets to form in the coating, the bursting of which causes the coating to become detached from its supporting surface.

The proportion of flux added to the composition is governed mainly by the following parameters;

the nature and grain-size of the refractory particles; the higher the fusion point and size of the said refractory particles, the larger the amount of flux to be added;

the nature of the flux; as a general rule the higher the fusion temperature of the refractory particles (for example magnesia), the lower the required fusion temperature of the flux;

the temperature at which the binder disintegrates: the lower this temperature, the higher the amount of flux to be added, to ensure that the sintering begins at a temperature substantially equal to that at which the binder disintegrates.

The coating according to the present invention may also contain up to about 20% by weight of inflammable carbonaceous material, which may be in the form of paper pulp, vegetable flour, dextrin, or a vegetable oil.

Contrary to what might be expected, carbonization of carbonaceous material promotes cohesion of the coating exposed to fire and heat.

It has been found in effect, that carbonization of carbonaceous material causes micro-pores to form without the coating. These micro-pores prevent the formation of larger cracks detrimental to satisfactory adhesion of the coating, since they allow the water of crystallization to escape thus preventing the formation of gas pockets.

The coating according to the invention may also comprise less than 80% (in weight), inorganic refractory or insulating articles and mixtures thereof in the form of particles of fibres selected among the group comprising essentially, perlite, vermiculite, fillite, glass fibres, rock-wool fibres, blast furnace-slag wool fibres, glass balls, silica, alumina, aluminum hydroxide, magnesia, dolomite, kaolin, colloidal clay and mixtures thereof.

The coating according to the invention may further comprise less than 40% (in weight), organic and synthetic materials in the form of particles or fibers, or slurry selected among the group comprising essentially vegetal waste, wood flour, cellulose, paper paste, cellulosic ethers, carbon powder, stearates, cellulose acetate, polyvinyl acetate, oil, polyvinylic alcohol, polystyrene, urea formaldehyde, phenol formaldehyde latex and derivatives thereof and acrylic compounds.

Other characteristics and advantages of the invention appear in the following description thereof.

When the inorganic binder used is a magnesia cement, the composition by weight of the coating according to the invention is preferably as follows:

| | |
|---|---|
| magnesium cement (magnesia chloride or magnesium sulphate with added magnesia): | 20 to 80% |
| perlite and/or vermiculite and/or fillite: | 10 to 0% |
| calcium borate: | 0 to 10% |
| synthetic fibres: | 60 to 0% |
| carbonaceous materials (wood flour) | 0 to 4% |
| iron oxides: | 0 to 2.2% |
| fluorspar: | 0 to 4% |
| compound introducing water of crystallization ($Na_3PO_4.12H_2O$). | 10 to 1.8% |

A few examples of coating compounds having a magnesia cement base are given below.

EXAMPLE I

| | |
|---|---|
| magnesium chloride: | 30% |
| magnesia: | 38.5% |
| perlite: | 7% |
| synthetic fibres: | 2% |
| calcium borate: | 10% |
| wood flour | 2% |
| iron oxide: | 0.2% |
| trisodium phosphate | 10% |

| | Ex. II | Ex. III | Ex. IV |
|---|---|---|---|
| magnesium sulphate: | 31% | 31% | 34% |
| magnesia | 33% | 33% | 37.5% |
| perlite: | 0% | 15% | 0% |
| synthetic fibres: | 0% | 0.5% | 0% |
| calcium borate: | 10% | 5% | |
| | | 10% | |
| wood flour: | 4.5% | 4% | 4.5% |
| fluorspar | 4% | 4% | 4% |
| sodium metasilicate: | 10% | 7.5% | 0% |
| trisodium phosphate: | 0% | 0% | 10% |

When coatings of this kind are exposed to heat or fire, they behave in the following manner:

The internal temperature of the coating, instead of increasing in the form of a continually growing curve, as would be expected, remains constant, for a period of several hours, at a temperature between 100° and 200° C. This imparts to the coatings according to the invention extremely advantageous fire and heat-resistant properties.

The said temperature level cannot possibly be attributed to thermal insulation provided by the components of the coating; it is believed that it is due to the presence, within the coating, of an appreciable quantity of water of crystallization.

The release of this water of crystallization in fact requires the application of an amount of heat corresponding to the binding energy of water molecules and 540 kcal/kg to transform this free water into steam. Furthermore, water released in the form of steam adds moisture to the atmosphere which aids in extinguishing the fire.

The temperature level at which this release of water occurs persists until all of the water of crystallization has been evaporated. Thus the time during which the temperature remains at this level is proportional to the amount of water of crystallization in the coating.

Cracking of the coating, due to disintegration of the inorganic binder, begins before all of the water of crystallization has been released. At this stage, the inorganic binder, which has now lost all of the physical properties of a binder, is no longer capable of providing cohesion of the coating. This is when sintering of the refractory particles occurs and assures a certain amount of cohesion, preventing the coating from becoming a dust.

Thanks to the flux (calcium borate and/or fluorspar), the sintering begins at a temperature substantially between 850° and 900° C., as a result the coating according to the invention provides protection against heat and fire up to temperature generally in excess of 1200° C.

The coating obtained with the composition according to Example I is very hard and adheres very well to all supports, including glass. It should not, however, be exposed to weathering. When exposed to fire, the temperature of these coatings remains constant at about 100° C. for between coatings remains constant at about 100° for between thirty minutes and six hours (depending on their thickness), due to the water of crystallization they contain. Moreover, sintering of the inorganic particles (perlite or vermiculite), brought about by the fluxes (calcium borate and fluorspar), allows the coating to remain cohesive up to temperatures well above 1000° C.

Coatings in accordance with Examples II, III and IV are preferably used for finishing layers applied to existing coatings, such as mineral or asbestos sheets, for the purpose of improving mechanical properties.

It is also possible to obtain, with a magnesia cement, a coating having good acoustical-insulating properties, with substantial resistance to fire, by modifying the composition as follows:

| | |
|---|---|
| magnesium chloride or magnesia sulphate with added magnesia: | 26 to 60% |
| perlite and/or vermiculite in grains of between 0 and 5 mm in diameter: | 15 to 38% |
| calcium borate and/or calcium carbonate | 3 to 0% |
| synthetic fibres: | 28 to 0% |
| wood flour: | 4 to 0% |
| fluorspar: | 4 to 0.5% |
| trisodium phosphate (Na$_3$PO$_4$.12H$_2$O) | 20 to 1.5% |

When the inorganic binder is an aluminous cement or of the Portland type (ordinary cement or NF 45 R white cement), the composition by weight of the coating according to the addition is as follows:

| | |
|---|---|
| aluminous and/or Portland cement: | 30 to 62% |
| inorganic particles (for example perlite and/or vermiculite: | 25 to 10% |
| carbonaceous materials: | 0 to 2% |
| cement-setting retardants or accelerators | 0 to 2% |
| fluxes: | 0 to 3.5% |
| mineral and/or organic fibres: | 40 to 0.5% |
| trisodium phosphate | 5 to 20% |

A few examples of coating compounds having an aluminous or Portland cement base are given below:

EXAMPLE V

| | |
|---|---|
| Portland cement: | 29% |
| aluminous cement: | 16% |
| fluorspar: | 5% |
| silica: | 20% |
| hydrated alumina: | 20% |
| trisodium phosphate | 10% |

| | Ex. VI | Ex. VII |
|---|---|---|
| aluminous cement: | 62% | 50% |
| perlite: | 10% | 15% |
| vermiculite: | 0% | 10% |
| synthetic fibres: | 0.5% | 0.5% |
| wood flour: | 4% | 4% |
| fluorspar: | 3.5% | 2.5% |
| trisodium phosphate | 20% | 17.5% |

| | Ex. VIII | Ex. IX |
|---|---|---|
| aluminous cement: | 20% | 17% |
| Portland cement: | 37% | 29% |
| quick lime: | 18% | 14% |
| perlite: | 20% | 18% |
| fluorspar: | 2% | 2% |
| wood flour: | 3% | 3% |
| trisodium phosphate | 0% | 18% |

| | Ex. X | Ex. XI | Ex. XII |
|---|---|---|---|
| aluminous cement: | 17.5% | 0% | 57.45% |
| Portland cement: | 32% | 58% | 0% |
| quick or slaked lime: | 26.5% | 0% | 0% |
| perlite: | 16% | 5% | 10% |
| vermiculite: | 0% | 10% | 0% |
| synthetic fibres: | 0.5% | 0.5% | 0% |
| fluorospar: | 3.5% | 3.5% | 3.5% |
| cement-setting retardants or accelerators: | 0% | 1% | 0.045% |
| wood flour: | 4% | 2% | 4% |
| trisodium phosphate | 0% | 20% | 0% |
| calcium carbonate: | 0% | 0% | 25% |

Coatings obtained with compositions according to Examples V to XII are not as hard as those obtained with compositions according to Examples I to IV. They adhere well to plaster, cement and iron. After exposure to fire, they do not adhere quite as well as coatings with a magnesia-cement base, but they have better fire-resistance, due to the excellent sintering between the inorganic particles.

In this respect, the coating according to Example XII has the best performance.

Coatings according to Examples V to XII may be exposed to weathering.

Coatings according to Examples V to IX are best for delaying the increase in temperature during a fire since, during setting, they retain a maximal quantity of water of crystallization.

In the case of ordinary Portland-type cements, slag cements, fused monocalcium-aluminate cements, artificial silicate tri- and boro-calcium cements, and refractory cements having a high alumina content, the addition of the compound which provides the water of crystallization, especially in the case of alkali metal carbonate, accelerates appreciably the setting of these cements, which is a disadvantage when the coatings are being applied.

The Applicant has found that this disadvantage may be overcome by adding to the coating composition a setting-retardant consisting of borax (sodium tetraborate) or boric acid.

In this connection, Example XIII is as follows:

| | |
|---|---|
| cement as specified above: | 57% |
| a powder charge (perlite, vermiculite, expanded glass spheres and mixtures thereof): | 15% |
| fluxes (colemanite and/or fluorspar): | 5% |
| hydrated sodium carbonate (water of crystallization): | 20% |
| borax and/or boric acid: | 3% |

When a coating of this kind 25 mm in thickness is exposed to a temperature of 1050° C. (as measured on one of its surfaces), after 60 minutes the temperature on the other surface scarcely reaches 170° C.

The composition starts to set only 10 minutes after the constituents have been mixed.

In the case of magnesia cements, the setting time depends upon the fire-loss of the magnesia used therein. The setting time is optimal when the magnesia fire-loss is about 12–13%. Otherwise the setting is often too slow.

The Applicant has found that this disadvantage may be overcome by adding, to the composition of a magnesia cement containing any kind of magnesia, quick and/or slaked lime as a setting accelerator.

This is represented in Example XIV below:

| | |
|---|---|
| magnesia cement (magnesium chloride and/or sulphate with added magnesia): | 72% |
| perlite and/or vermiculite and/or expanded glass spheres and/or expanded polystyrene: | 15% |
| carbonaceous materials (wood flour or the like): | 15% |
| fluxes (fluorspar and/or colemanite): | 3% |
| quick and/or slaked lime: | 5% |
| | 5% |

A composition of this kind begins to set about 15 minutes.

Additionnal examples are given hereafter:

EXAMPLES XV (a) TO (f)

Coating having good mechanical resistance, insulating and fire-proof properties

| | (a) | (b) | (c) | (d) | (e) | (f) |
|---|---|---|---|---|---|---|
| Rock-wool fibers weight % | 10 | 25 | 25 | 30 | 40 | 50 |
| Cement weight % | 55 | 50 | 50 | 60 | 40 | 30 |
| Oil weight % | 2 | 3 | 2 | 2 | 2 | 2 |
| trisodium phosphate weight % | 20 | 10 | 12 | 8 | 5 | 10 |
| perlite weight % | 8 | 3 | 8 | 0 | 12 | 8 |
| vermiculite weight % | 5 | 7 | 3 | 0 | 3 | 0 |
| kaolin weight % | 0 | 2 | 1 | 0 | 0 | 0 |

EXEMPLES XVI (a) TO (c)

Coating having good insulating, acoustic and fire-proof properties

| | (a) | (b) | (c) |
|---|---|---|---|
| rock-wool fibers weight % | 66.4 | 71.4 | 80 |
| cement weight % | 20.7 | 22.1 | 11 |
| oil weight % | 2.5 | 1.5 | 1 |
| trisodium phosphate weight % | 10.4 | 5 | 8 |

EXAMPLES XVII (a) TO (e)

Coating relatively hard and having excellent fire-proof properties

| | (a) | (b) | (c) | (d) | (e) |
|---|---|---|---|---|---|
| cement weight % | 57 | 80 | 55 | 57 | 60 |
| trisodium phosphate weight % | 15 | 5 | 20 | 15 | 10 |
| oil weight % | 0 | 0 | 0 | 0 | 3 |
| vermiculite weight % | 15 | 5 | 12 | 22.5 | 8 |
| perlite weight % | 8 | 8 | 8 | 0 | 13 |
| kaolin weight % | 1 | 1 | 1 | 1 | 1 |
| polyvinyl acetate weight % | 0 | 0 | 0 | 2.5 | 2 |
| sugar weight % | 2 | 1 | 2 | 2 | 3 |
| paper paste weight % | 0 | 0 | 2 | 0 | 0 |

The compositions of examples XV to XVII may comprise less than 15% of conventional adjuvants, cement-setting retardants or accelerators, fluidifiers, plasticizers, air driving agents, anti-freeze agents, hydrofuge agents, stripping products, surface hardeners and mixtures thereof selected among the group comprising carbonates, aluminates, sodium or potassium sulfate, chlorides, boron compounds, water, soluble lithium salts, polyamino-carboxylic acids, and alkaline salts thereof, chalk, sugars, lignosulfonates, gluconates, wood-resins, calcium ligno sulfonate as fluidifier, bentonite and kieselguhr as plasticizer.

The amount of the above adjuvants in the composition depends on the climatic conditions of the application by projection of the composition on the support to be coated.

The weight percentage of the trisodic phosphate in the composition may be comprised between 5 to 30%.

Experience has shown that if such percentage is lower than 5%, the fire-proof properties of the coating are substantially the same as those of a coating free from trisodium phosphate. Furthermore, in certain cases, it has been ascertained that a low percentage of trisodium phosphate imparts to the coating fire-proof properties which are slightly inferior to these of a coating free from trisodium phosphate. When the percentage of trisodium phosphate is higher than 30%, fissures are created in the coating when exposed to fire. These fissures are caused by the too important amount of water released from the coating under the action of the fire.

The hydrated trisodium phosphate used in the present invention, ordinarily crystallizes with a maximum of 12 molecules of water. Certain crystalline forms of trisodium phosphate have less than 12 molecules of water. Such crystalline forms may also be used in the composition contemplated by the present invention but with weight percentages which are substantially higher than these disclosed in the present specification.

We claim:

1. A coating for protecting structures against fire and heat, containing by weight percent

| | |
|---|---|
| a cement selected from the group consisting of aluminous and Portland cements and mixtures thereof: | 10 to 80% |
| hydrated trisodium phosphate $(Na_3PO_4.12H_2O)$: | 5 to 20%. |

2. A coating as claimed in claim 1, containing also a small but effective amount of a flux selected from the group consisting of calcium borate and fluorspar and mixtures thereof, said amount being effective to assure superficial sintering of the coating at a temperature between 850° to 900° C.

3. A coating according to claim 1, further comprising a substantial amount less than 80% by weight of inorganic refractory or insulating particles or fibers or mixtures thereof.

4. A coating according to claim 1, further comprising a substantial amount less than 40% by weight of organic materials in the form of particles or fibers.

* * * * *